US011975841B2

United States Patent
Holstine et al.

(10) Patent No.: US 11,975,841 B2
(45) Date of Patent: May 7, 2024

(54) BIOMETRICALLY ACTUATED OCCUPANT RESTRAINT SYSTEM AND METHOD FOR A VEHICLE

(71) Applicant: ROCKWELL COLLINS, INC., Cedar Rapids, IA (US)

(72) Inventors: Steve A. Holstine, Peyton, CO (US); Ken Mitchell, Englewood, CO (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 0 days.

(21) Appl. No.: 17/959,182

(22) Filed: Oct. 3, 2022

(65) Prior Publication Data
US 2024/0109661 A1    Apr. 4, 2024

(51) Int. Cl.
*B64D 11/06*     (2006.01)
*B64D 25/10*     (2006.01)

(52) U.S. Cl.
CPC .......... *B64D 11/062* (2014.12); *B64D 25/10* (2013.01)

(58) Field of Classification Search
CPC .......... G06F 3/012; G06F 3/013; G06F 3/033; G06F 21/32; G06F 21/6218; A63F 13/428
See application file for complete search history.

(56) References Cited

U.S. PATENT DOCUMENTS

| | | | | |
|---|---|---|---|---|
| 4,667,904 A | * | 5/1987 | Herndon | B64D 11/06 297/480 |
| 10,710,725 B2 | | 7/2020 | Sinusas et al. | |
| 10,752,360 B2 | | 8/2020 | Sinusas et al. | |
| 2017/0325521 A1 | * | 11/2017 | Li | A41D 13/018 |
| 2019/0086998 A1 | * | 3/2019 | Kunzler | G06F 3/013 |
| 2019/0184853 A1 | * | 6/2019 | Thomas | B60R 21/01516 |
| 2019/0332902 A1 | * | 10/2019 | Gallagher | G06V 10/811 |
| 2020/0334453 A1 | * | 10/2020 | Thomas | B60R 21/01512 |
| 2021/0347323 A1 | * | 11/2021 | Thomas | B60R 21/01538 |

FOREIGN PATENT DOCUMENTS

WO    2010027269    3/2010

* cited by examiner

*Primary Examiner* — John Kwon
(74) *Attorney, Agent, or Firm* — SNELL & WILMER L.L.P.

(57) ABSTRACT

According to various embodiments, a biomedically actuated occupant restraint system includes an occupant restraint system for a vehicle, the occupant restraint system having a locked position and an unlocked position. The biomedically actuated occupant restraint system further includes an occupant monitoring system operably connected to the occupant restraint system, the occupant monitoring system configured for monitoring a plurality of physiological conditions of an occupant of the vehicle. The occupant monitoring system includes a biometric sensor module including a plurality of physiological sensors configured for measuring a plurality of physiological conditions of the occupant and asserting a plurality of sensor signals, and a controller configured to receive the plurality of sensor signals and determine whether the occupant is incapacitated. The controller being configured to send a command to lock the occupant restraint system in response to determining the occupant is incapacitated.

19 Claims, 6 Drawing Sheets

BIOMETRICALLY ACTUATED OCCUPANT RESTRAINT SYSTEM AND METHOD FOR A VEHICLE

FIELD

The present disclosure relates to occupant restraint systems for a vehicle and, more particularly, to an occupant restraint system that is responsive to occupant conditions during operation of the vehicle.

BACKGROUND

A pilot in an aircraft may experience extreme forces during operation of the aircraft that could affect the pilot's ability to control the aircraft and also affect the pilot's ability to control their own body in the aircraft. When a pilot loses consciousness, the pilot also loses motor control of their body, which could lead to injuries to the unconscious pilot's head, arms, spine, and upper torso, for example, during continued maneuvers of the aircraft controlled by another pilot. What is needed is a solution that addresses these and possibly other problems.

SUMMARY

Disclosed herein is biomedically actuated occupant restraint system. In accordance with various embodiments, the biomedically actuated occupant restraint system may comprise an occupant restraint system for a vehicle, the occupant restraint system having a locked position and an unlocked position. The biomedically actuated occupant restraint system may further include an occupant monitoring system operably connected to the occupant restraint system, the occupant monitoring system configured for monitoring a plurality of physiological conditions of an occupant of the vehicle. The occupant monitoring system may include a biometric sensor module including a plurality of physiological sensors configured for measuring a plurality of physiological conditions of the occupant and asserting a plurality of sensor signals, and a controller configured to receive the plurality of sensor signals and determine whether the occupant is incapacitated. The controller being configured to send a command to lock the occupant restraint system in response to determining the occupant is incapacitated.

In various embodiments, the biomedically actuated occupant restraint system may further comprise the controller being configured to send a command to unlock the occupant restraint system in response to determining the occupant is not incapacitated. The occupant restraint device may be a torso restraint. The torso restraint may include at least one of a belt, a strap, and a harness configured for restraining the torso of the occupant. The vehicle may be an aerospace vehicle.

The biomedically actuated occupant restraint system may further include a seat disposed in the vehicle adjacent to the occupant restraint device, the occupant restraint device configured for restraining the occupant in relation to a seat back portion of the seat. The seat may be an ejection seat having an ejection propulsion system. The occupant restraint device may be integrated with the ejection seat.

The occupant restraint system may further include an inertial reel module with a spool module having a cylindrical element for attaching to an end portion of the occupant restraint device to at least one of extend and retract at least a portion of the occupant restraint device to selectively tighten and loosen, the spool module configured to rotate to tighten in response to movement of the restrained occupant toward a neutral position.

The biomedically actuated occupant restraint system may further include an occupant restraint device configured to selectively extend and retract, the occupant restraint device configured to not extend when the occupant restraint system is locked, the occupant restraint device configured to retract in response to movement of the restrained occupant toward a neutral position.

The biomedically actuated occupant restraint system may further include a manual release operably connected to the occupant restraint system for manually locking and unlocking the occupant restraint system, and a lock actuator operably connected to the controller, the lock actuator for locking the inertial reel module based on a command from the controller. The biomedically actuated occupant restraint system may further include a retraction module that is operably coupled to the occupant restraint system and configured to rapidly retract the occupant restraint in the ejection seat prior to ejection. Determining the occupant is incapacitated may be based on at least one of data indicative of a loss of motor control by the occupant, and/or data indicative of a loss of consciousness by the occupant. The biometric sensor module may include one or more of an electroencephalogram (EEG) sensor, an electrocardiogram (ECG) sensor, a blood pressure (BP) sensor, an oxygen and/or respiration sensor, a camera, and a microphone.

The controller may include a tangible, non-transitory memory configured to communicate with the controller, the tangible, non-transitory memory having instructions stored thereon that, in response to execution by the controller, cause the controller to perform operations including receiving, by the controller, the plurality of physiological sensor signals based on a physiological condition of the occupant, measuring, by the controller, each of the plurality of physiological sensor signals to determine a baseline value from each sensor, determining, by the controller, a change from the baseline value related to data indicative of an unconscious state of the occupant, and outputting, by the controller, a command to lock the occupant restraint system. The method may further include measuring, by the controller, each of the plurality of physiological sensor signals to determine a new baseline value from each sensor, determining, by the controller, a change from the new baseline value related to data indicative of a conscious state of the occupant, and outputting, by the controller, a command to unlock the occupant restraint system.

A method for biomedically actuating an occupant restraint system is also disclosed herein. In accordance with various embodiments, the method may comprise receiving a plurality of physiological sensor signals based on a physiological condition of a vehicle occupant, measuring each of the plurality of physiological sensor signals to determine a baseline value from each sensor, determining a change from the baseline value related to data indicative of an unconscious state of the occupant, and outputting a command to lock an occupant restraint system for the occupant in the vehicle. In various embodiments, the method may further comprise measuring each of the plurality of physiological sensor signals to determine a new baseline value from each sensor, determining a change from the new baseline value related to data indicative of a conscious state of the occupant; and outputting a command to unlock the occupant restraint system.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nutjten to fall outside the scope of patentable subject matter under 35 U.S.C. § 101.

Figure 1A:
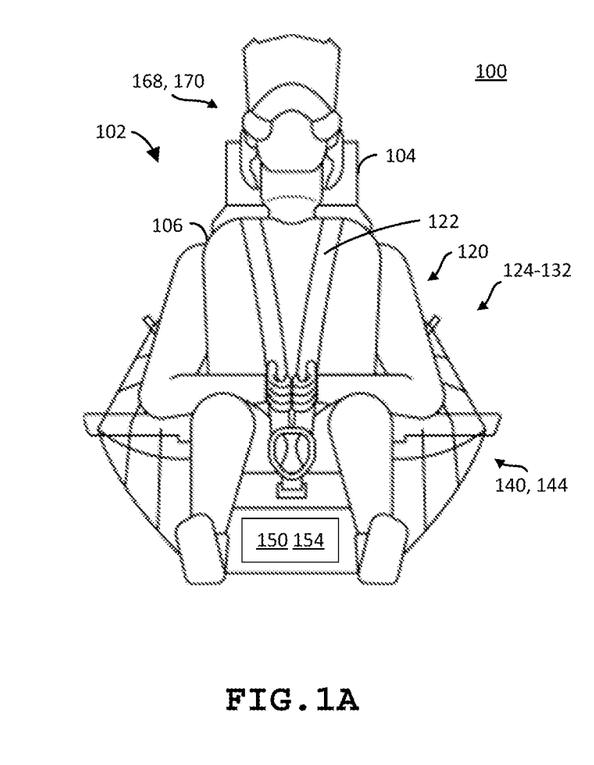
FIGS. 1A-1B illustrate an aircraft with a biometrically actuated occupant restraint system for use with an aircraft ejection seat, in accordance with various embodiments.
Figure 1B:
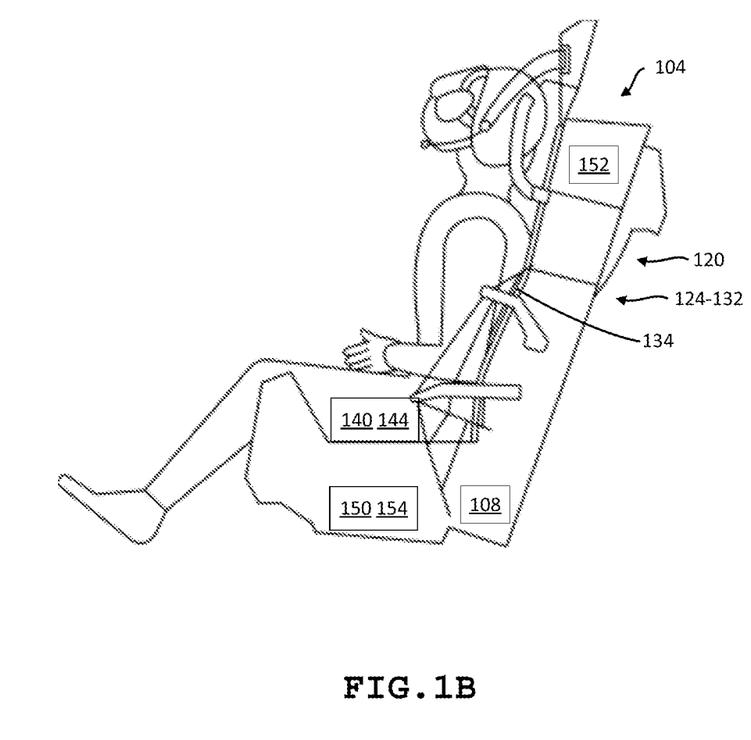

Referring now to FIGS. 1A-1B, a vehicle 100 such as an aircraft, with a biometrically actuated occupant restraint system 102 for use with an aircraft ejection seat 104 is illustrated, in accordance with various embodiments. Biometrically actuated occupant restraint system 102 may be associated with a seat 104 installed in an aerospace vehicle such as an aircraft, spacecraft, or other vehicle to safely support and restrain an occupant 106, such as a pilot of the aerospace vehicle, in response to occupant 106 being incapacitated. In accordance with various embodiments, seat 104 may be an ejection seat including an ejection propulsion system 108 to safely expel ejection seat 104 and occupant 106 of the ejection seat from a cockpit or other portion of aircraft 100. Ejection seat 104 may be urged from (e.g., expelled from) the cockpit of the aircraft by an ejection propulsion system 108, which may include one or more rockets or other propulsion devices that are activated as a part of an ejection sequence. Ejection may be initiated in response to actuation of an ejection handle.

It is noted that occupant 106 is depicted in FIGS. 1A-1B as assuming a neutral posture or position in seat 104. A neutral or aligned position within seat 104 includes the torso of occupant 106 being disposed centrally in seat 104 with both shoulders of occupant 106 being disposed against a seat back portion 134 of seat 104. Assuming a neutral position within seat 104 is desirable to reduce injury by increasing marginal distances between the body of occupant 106 (e.g., head, shoulders, upper torso/upper trunk, arms) and adjacent structures in a cockpit, crew bay, or in preparation for ejection from an aircraft, for example. In contrast, an unaligned position of occupant 106 within seat 104 may include the torso of occupant 106 leaning forward or leaning to one side with one or more shoulders away from seat 104 and exposed to increased injury.

In various embodiments, the one or more seats 104 may include occupant restraint capabilities described herein but may not have the capability to eject from the aircraft or other vehicle. Occupant 106 may be restrained in seat 104 using an occupant restraint system 120 which may include one or more occupant restraint devices 122 comprising one or more belts, straps, or harnesses configured to restrain a torso of occupant 106 in a position adjacent to seat 104, at least partially situated within seat 104, or at least partially situated against seat 104. This disclosure may be applied to any suitable vehicle, including but not limited to a passenger aircraft, a cargo aircraft, a military (e.g., fighter) aircraft, a spacecraft, a submarine, a truck, a bus, an automobile, or the like, having various locations within the vehicle where occupants may be restrained in a seat and could lose consciousness or lose motor control of their bodies.

Figure 2:
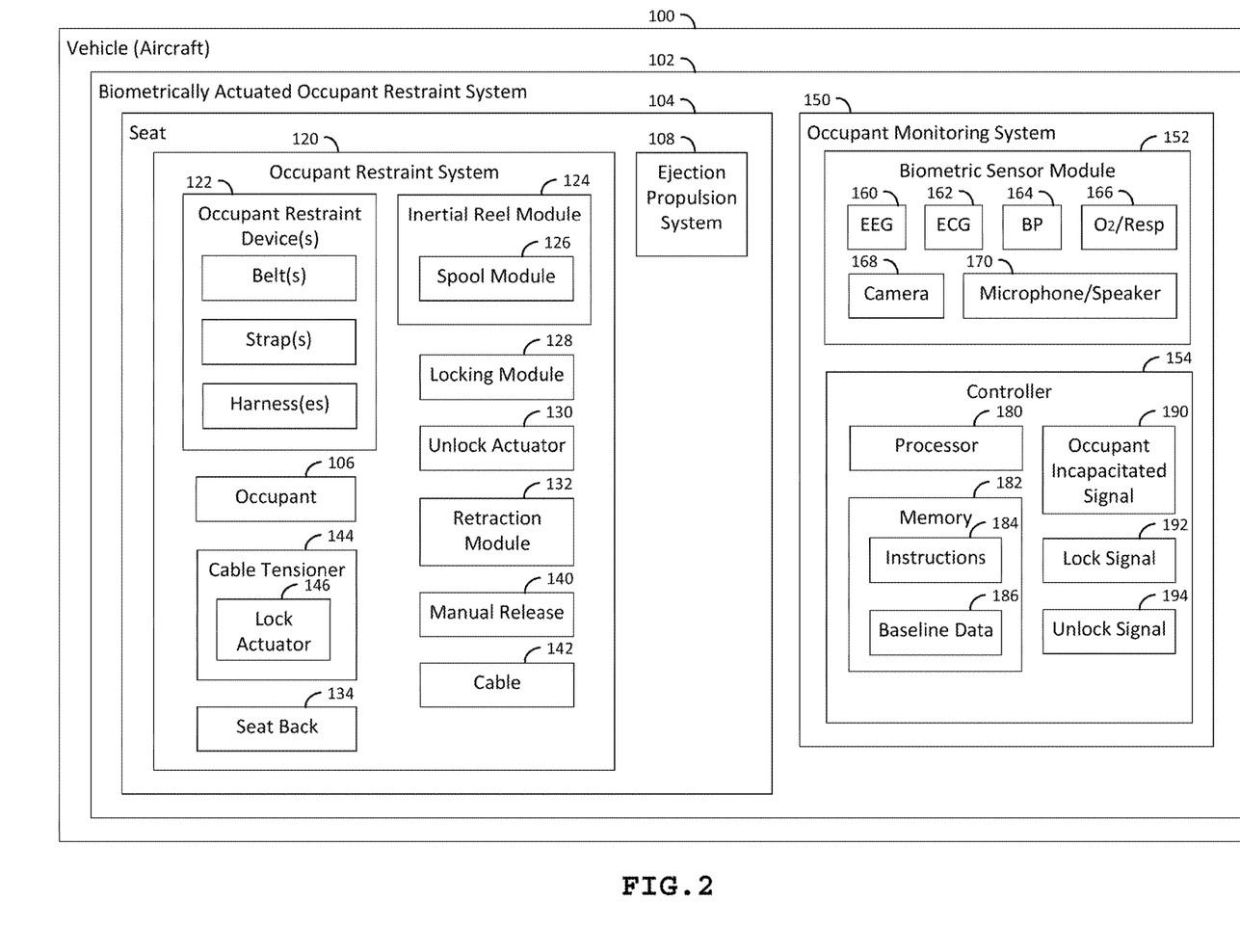
FIG. 2 illustrates a block diagram of a vehicle having a biometrically actuated occupant restraint system, in accordance with various embodiments.

Referring now to FIG. 2, a block diagram of a vehicle 100 having a biometrically actuated occupant restraint system 102 is illustrated, according to various embodiments. Vehicle 100 is similar in some ways to aircraft 100 described in reference to FIGS. 1A-1B. Vehicle 100 may have a biometrically actuated occupant restraint system 102, associated with one or more seats 104, with each seat for supporting an occupant 106 in various locations within the vehicle, such as a cockpit, a crew bay, or the like. Biometrically actuated occupant restraint system 102 may include an occupant restraint system 120, as described in reference to FIGS. 1A-1B, and an occupant monitoring system 150. In various embodiments, the one or more seats 104 may also include an ejection propulsion system 108 as described in reference to FIGS. 1A-1B.

Occupant restraint system 120 may include one or more occupant restraint devices 122, such as one or more belts, straps, or harnesses, as described in reference to FIGS. 1A-1B. Occupant restraint system 120 may also include an inertial reel module 124 with a spool module 126, a locking module 128, an unlock actuator 130, and a retraction module 132.

Inertial reel module 124 may be operably connected with spool module 126 to automatically lock spool module 126 under certain conditions, preventing further extension of occupant restraint device 122 in response to the vehicle experiencing acceleration forces above a predetermined limit. For example, in belt-activated systems, centrifugal force, caused by a sudden jerking of the belt, strap, or harness (e.g., a large impulse), may cause a lever attached to spool device in spool module 126 to move outward. The extended lever may activate a pawl or other device that catches a toothed gear attached to the spool device, stopping its rotating or spinning motion. For an automobile, truck, or bus, the sudden jerking of the belt, strap, or harness of occupant restraint device 122 may be caused by a dynamically changing condition such as sudden and severe turning or braking conditions. For an aircraft, sudden jerking of occupant restraint device 122 may be caused by a dynamically changing condition such as a sudden change in vehicle attitude, including a sudden change in pitch, roll, or bank angle. In various embodiments, inertial reel module 124 may prevent further extension of occupant restraint device 122 in response to the occupant restraint device 122 being withdrawn from occupant restraint system 120 at a linear rate that is higher (e.g., a faster speed) than a predetermined limit. Occupant restraint device 122 being withdrawn from occupant restraint system at a high rate it may indicate occupant 106 and/or vehicle 100 is experiencing acceleration forces above a predetermined limit because the belt, strap, or harness of occupant restraint device 122 is pulled or jerked rapidly. By locking spool module 126, occupant restraint device 122 is prevented from further extension and occupant 106 may be protected from injury due to more extreme movements that would otherwise be experienced.

Spool module 126 may include a cylindrical element (e.g. a spool portion) for attaching to an end portion of occupant restraint device 122, such as a flexible belt or webbed portion attached to an end portion of a belt, strap, or harness, that may be wound around the spool portion and operable to take up (e.g. retract into) or to play out (e.g. extend out from) a portion of occupant restraint device 122 into or out from occupant restraint system 120 under the control of inertial reel module 124. In this manner, occupant restraint device 122 may tighten or loosen around a torso of occupant 106 based on rotation (e.g., forward or reverse) of spool module 126. Occupant restraint system 120, comprising at least one of a belt, strap, and a harness, may be considered a torso restraint to prevent or restrict freedom of movement of a torso of occupant 106 such as by preventing torso bending movements, including leaning forward and leaning to one side, or torso twisting. At least a portion of occupant restraint system may also be attached to a rigid, fixed point within vehicle 100 such as a ceiling, pillar, monument, wall, or floor of vehicle 100 to provide additional support. Spool module 126 may include a spring and ratchet assembly for retracting occupant restraint device 122.

Locking module 128 is operably connected with inertial reel module 124 to control the operation of spool module 126. As will be described more fully below, locking module 128 responds to an occupant incapacitated signal 190 and/or commands from a controller 154. Briefly, in response to occupant incapacitated signal 190 being asserted, locking module 128 locks inertial reel module 124 and prevents spool module 126 from further extension of occupant restraint device 122 (e.g., restricts increasing freedom of movement for occupant 106) while allowing retraction of occupant restraint device 122 in response to a torso of occupant 106 moving toward a neutral position in seat 104. Such movements may be in response to movement of the vehicle while occupant 106 is unconscious or incapacitated. In this manner, controller 154 locks occupant restraint system 120 in response to detecting occupant 106 is incapacitated and restricts (e.g., prevents or tends to prevent) occupant from experiencing an increasing freedom of movement (e.g., greater torso forward bending, side bending, or twisting), while allowing spool module 126 to retract, for example, under control of a spring-loaded ratchet. Stated differently, controller 154 is configured to receive the plurality of sensor signals and determine whether occupant 106 is incapacitated and send a command to lock occupant restraint system 120 in response to determining occupant 106 is incapacitated. Conversely, locking module 128, in an unlocked position, allows play out of occupant restraint device 122 from occupant restraint system 120 leading to increasing freedom of movement for occupant 106 in seat 104 while occupant incapacitated signal 190 is not asserted, indicating that occupant is not (e.g., is no longer) incapacitated. In this manner, controller 154 unlocks occupant restraint system 120 in response to detecting occupant 106 is not (or is no longer) incapacitated. Stated differently, controller 154 is configured to receive the plurality of sensor signals and determine whether occupant 106 is not (e.g., no longer) incapacitated and send a command to unlock occupant restraint system 120 in response to determining occupant 106 is not incapacitated. In this manner, occupant restraint system 120 includes an occupant restraint device 122 that is configured to selectively extend and retract. In various embodiments, controller 154 may be implemented as a procedural paradigm. In various embodiments, controller 154 may be implemented as a state machine.

Figure 3A:
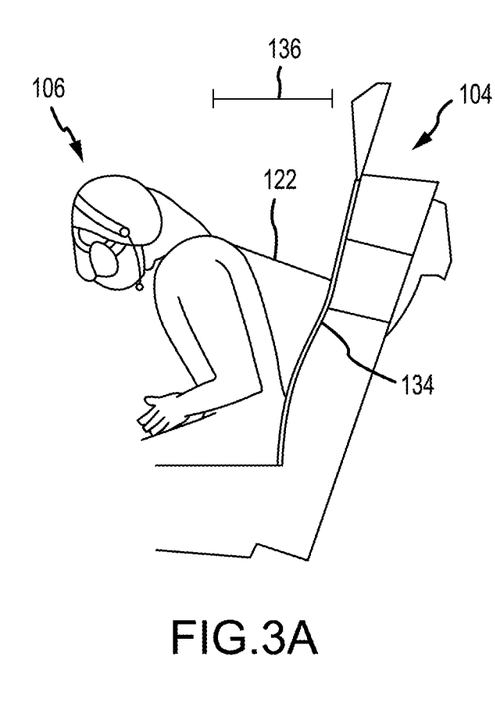
FIGS. 3A-3C illustrate an occupant moving from an unaligned position toward a neutral position in a seat, in accordance with various embodiments.
Figure 3B:
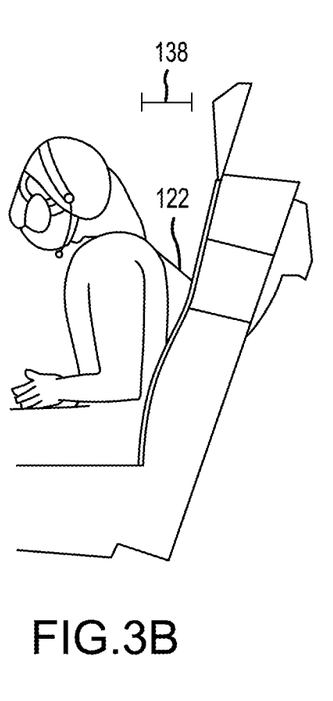
Figure 3C:
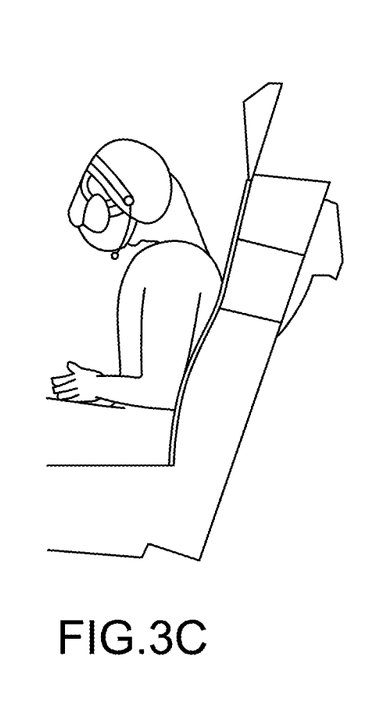

Referring now to FIGS. 3A-3C, an occupant moves from an unaligned position toward a neutral position in a seat is illustrated in accordance with various embodiments. FIG. 3A illustrates an example of an unconscious occupant 106 shown with their torso forward in a leaning position, head forward, and shoulders away from the back of seat portion 134 at a first distance 136, where occupant restraint device 122 is significantly extended. As described, locking module 128 locks inertial reel module 124 and prevents spool module 126 from further extension of occupant restraint device 122 while allowing retraction of occupant restraint device 122 as the torso of occupant 106 moves toward a more neutral position in seat 104 where occupant's shoulders are moved closer to seat back portion 134 in response to movement of the vehicle while occupant 106 with occupant restraint device 122 is extended at a second distance 138 but which is retracted from a first distance 136, as shown in FIG. 3B. Finally, FIG. 3C illustrates unconscious occupant 106 with shoulders fully against seat back portion 134, as illustrated in FIG. 1B. In this manner, occupant restraint device 122 may restrain occupant 106 (e.g., a restrained occupant) in relation to seat back portion 134 of seat 104. Assuming a neutral position within seat 104 is desirable to reduce injury by increasing marginal distances between the body of occupant 106 and adjacent structures within a cockpit, crew bay, or in preparation for ejection from an aircraft, for example.

Referring again briefly to FIG. 2, unlock actuator 130 is operably connected with inertial reel module 124 and locking module 128 to control the operation of spool module 126. Unlock actuator 130 may include a solenoid and a mechanical linkage for electromechanically operating locking module 128 to place locking module 128 from a locked to an unlocked position in response to unlock actuator 130 being activated. In various embodiments, unlock actuator 130 may include a motor and gear assembly for moving locking module 128 from a locked to an unlocked position in response to unlock actuator 130 being activated.

Retraction module 132 is operably connected with inertial reel module 124 and spool module 126 to rapidly and forcefully withdraw occupant restraint device 122 into occupant restraint system 120 in preparation for ejection in response to initiation of an ejection sequence, emergency landing, or other emergency situation. Retraction module 132 may include an inertial reel gas generator (IRGG) for providing high pressure gas to inertial reel module 124 to forcefully withdraw occupant restraint device 122 into occupant restraint system 120. In this manner, retraction module 132 is operable to maximally restrain occupant in ejection seat 104 prior to ejection.

Occupant restraint system 120 may also include a manual release 140 for occupant restraint device 122 to manually release spool module 126 and allow play out of occupant restraint device 122 from occupant restraint system 120 leading to increasing freedom of movement for occupant 106 in seat 104 in response to occupant incapacitated signal 190 not being asserted. As illustrated in FIGS. 1A-1B, a neutral or aligned position within seat 104 includes the torso of occupant 106 being disposed centrally in seat 104 with both shoulders of occupant 106 being disposed against a seat back portion 134 of seat 104.

Occupant monitoring system 150 may include a biometric sensor module 152 with a plurality of non-invasive, light weight sensors for biometrically measuring various physiological conditions or aspects of an occupant's (e.g., a pilot's) health and incapacity status. Biometric sensor module 152 may include an electroencephalogram (EEG) sensor 160, an electrocardiogram (ECG) sensor 162, a blood pressure (BP) sensor 164, an oxygen and/or respiration sensor 166, a camera 168, and a microphone and/or speaker assembly 170. Ongoing measurement of physiological aspects of occupant 106 may establish a baseline for interpreting differences in the physiological status of occupant 106, and especially for detecting whether occupant 106 may have lost consciousness and/or lost motor control over their body. In this manner, controller 154 may determine occupant 106 is incapacitated based on at least one of data indicative of a loss of motor control by occupant 106 or data indicative of a loss of consciousness by occupant 106. Similarly, a new baseline may be established and used for detecting that occupant 106 may have regained consciousness and/or regained motor control over their body. Signals from each of the sensors may be sent via wired or wireless communication. Processor 180 may perform signal conditioning and run various algorithms that compare various values to suitable thresholds to make determinations and to detect a state of consciousness of occupant 106. It is understood that if occupant 106 becomes unconscious, the occupant also loses motor control of their body which could lead to injuries during continued maneuvers of the vehicle, for example. However, it is possible that an occupant may lose significant motor control without becoming fully unconscious, so incapacity as used herein encompasses the broader condition of losing motor control in addition to losing consciousness.

Electroencephalogram (EEG) sensor 160 may include a brainwave detection sensor array that is configured to measure electrical brain activity from occupant 106 and may be located on a skull cap and may be worn under a helmet or other head covering. In various embodiments, brainwave detection sensor array may be located in the helmet in proximity to the head of occupant 106. Electroencephalogram sensor 160 may be operably coupled to the head of occupant 106 to measure brain waves including alpha waves, beta waves, delta waves, or theta waves as well as spikes in each of those waves. A change in frequency or spikes in any of these waves greater than a predetermined threshold amount may indicate a change in (e.g., a loss of) consciousness or motor control.

Electrocardiogram sensor 162 may include one or more sensors in a sensor array configured to measure heart activity of occupant 106. In various embodiments, electrocardiogram sensor 162 may be located on a chest strap worn by occupant 106. Electrocardiogram sensor 162 may be operably coupled to the chest and heart of occupant 106 to measure heart rate. A change in heart rate, rhythm, or waveform morphology may be used to detect a change in consciousness. Data from electrocardiogram sensor 162 may be used in conjunction with data from electroencephalogram (EEG) sensor 160 or other sensors to more accurately detect a loss of consciousness.

Blood pressure (BP) sensor 164 may include a pressure cuff worn around a limb of occupant 106 along with a pressure sensor for measuring pressure in the limb, where the pressure cuff is inflated to restrict blood flow in the limb and a pressure sensor may first detect a systolic heart beat at a first pressure value as the pressure in the cuff is released, then the pressure sensor may next detect emergence of the systolic and a diastolic heart beats as the pressure in the cuff drops below a second pressure to determine the systolic and diastolic pressures, respectively. In various embodiments, two or more pulse detection sensors may be located on the body of occupant 106 at a known distance from each other to measure the pulse transit time (PTT) and infer a blood pressure measurement, in addition to other methods. Sequential measurements of blood pressure may be needed to obtain an accurate reading due to movement of occupant 106 in vehicle 100, for example. Suddenly increasing or suddenly decreasing blood pressure for occupant 106 may indicate occupant is under stress, duress, or may be losing consciousness.

Oxygen and/or respiration sensor 166 (e.g., oximeter and/or respirometer) may include one or more non-invasive devices configured to measure oxygenation (oxygen saturation) in the blood and respirations of occupant 106. For a human occupant, respiration is normally controlled by the autonomic nervous system, so that respiration runs automatically except in circumstances where some factors may affect or interfere in this automatic process. An occupant 106 may experience physical extremes that may significantly interfere with respiration of a conscious person in response to sensory excitation and stress, while an unconscious person may be less responsive to the physical extremes and the corresponding respiration rate and respiration volume may be significantly less. By measuring the oxygenation and respiration response of occupant 106 to extreme conditions and detecting a sudden change in these biometric attributes, it may be possible to detect a loss of consciousness.

Camera 168 may include light detector(s), infrared detector(s), or any other sensor capable of detecting image data corresponding to any wavelength of light. Camera 168 may be used to detect eye lid opening/closing (e.g., blink/stare duration), eye movement, gaze angle, head angle, and/or image data corresponding to a biometric features of occupant 106. Camera 168 may be located on a vehicle interior or on a helmet visor worn by occupant 106, or at any other location where the face, eyes, head, and/or neck of occupant 106 may be monitored to detect such features. For example, occupant 106 may wear a helmet with camera 168 mounted on or within a portion of the helmet in proximity to one or both of occupant's eyes and face. In various embodiments, one or more sensors in biometric sensor module 152 may be disposed adjacent to occupant 106 and may be in contact with the body of occupant 106 to measure various biometric attributes. For a camera operating in a visible or infrared (thermal) range, imaging of the facial region may detect whether occupant 106 is flushed (e.g., surface blood vessels have dilated) which may indicate a change in physiological status. A sudden change in any of these facial or eye-related features may indicate occupant 106 has lost consciousness. Microphone and/or speaker assembly 170 may include a speaker (sound emitter) be used for auditory stimulus and a microphone (sound receiver) for use in determining the verbal responsiveness of occupant 106. For example, the speaker could emit a tone or a command that occupant 106 must respond to either verbally or by pressing a button in the vehicle within a predetermined period of time. A change in responsiveness of occupant 106 may indicate occupant 106 has lost capacity to respond and may have lost consciousness or lost voluntary motor control.

The sensor data from the plurality of sensors in biometric sensor module 152, separately or in combination, may be synthesized to provide an indication of the health and consciousness status of occupant 106. In response to determining occupant 106 has lost consciousness, controller 154 may assert occupant incapacitated signal 190, as discussed above, and assert lock signal 192, as will be further described below. As described, determining occupant 106 has lost consciousness may lead to a change in state of the biometrically actuated occupant restraint system 102 and assertion of lock signal 192. In response to determining that occupant 106 has regained consciousness, controller 154 may de-assert occupant incapacitated signal 190 and assert unlock signal 194, as will be further described below. As described, determining occupant 106 has regained consciousness may lead to a change in state of the biometrically actuated occupant restraint system 102 and assertion of unlock signal 194.

Controller 154 may include one or more logic devices such as one or more of a processor 180 which may be implemented as a central processing unit (CPU), a digital signal processor (DSP), a field programmable gate array (FPGA), an application specific integrated circuit (ASIC), or the like. Processor 180 may include a memory 182 for storing instructions that, in response to the instructions being executed, may cause processor 180 to implement various algorithms to process data from biometric sensor module 152, determine the consciousness and/or motor control status of occupant 106, and cause controller 154 to assert outputs such as occupant incapacitated signal 190, a lock signal 192, an unlock signal 194, and the like. The assertion of occupant incapacitated signal 190, a lock signal 192, an unlock signal 194, and the like, may correspond to commands issued by controller 154. In this manner, controller 154 may include a tangible, non-transitory memory 182 configured to communicate with controller 154, where the tangible, non-transitory memory 182 has or contains instructions stored thereon that, in response to execution of those instructions by controller 154, cause controller 154 to perform the operations described herein.

Memory 182 may be implemented as a read only memory (ROM), a random access memory (RAM), cache memory, or any non-transitory memory known in the art. Memory 182 may store instructions usable by processor 180 or other logic device(s) to perform operations and make determinations regarding the physiological status (e.g., conscious with motor control, or not) of occupant 106. Memory 182 may also store baseline data collected from the plurality of sensors in biometric sensor module 152, as will be described more fully below. In various embodiments, memory 182 may be a permanent, removable, or replaceable computer-readable storage medium for storing and retrieving instructions for implementing any of the various methods herein described. For example, computer code corresponding to biometrically actuating occupant restraint system 102 and corresponding to whether to activate, deactivate, or decline to activate or deactivate, the different aspects described herein, may be stored.

Occupant incapacitated signal 190, lock signal 192, and unlock signal 194 may be implemented in various ways, including asserting a discrete signal line/wire, setting a bit (e.g., binary digit) to an on/off (e.g. 1 or 0) state in a register or at a predetermined memory location to indicate and control behavior of various elements in biometrically actuated occupant restraint system 104. Related hardware may receive a discrete occupant incapacitated signal 190, a discrete lock signal 192, and a discrete unlock signal 194, or an intermediate version thereof, and then transform such signals for control of operably coupled elements and systems. For example, in response to occupant incapacitated signal 190 being asserted, controller 154 may also assert lock signal 192. Assertion of lock signal 192 may cause lock actuator 146 to activate and lock inertial reel module 124 as discussed above. Conversely, in response to occupant incapacitated signal 190 not being asserted, or no longer being asserted, controller 154 may also de-assert lock signal 192 and assert unlock signal 194. Assertion of unlock signal 194 may cause unlock actuator 130 to activate and unlock inertial reel module 124 as discussed above.

Figure 4:
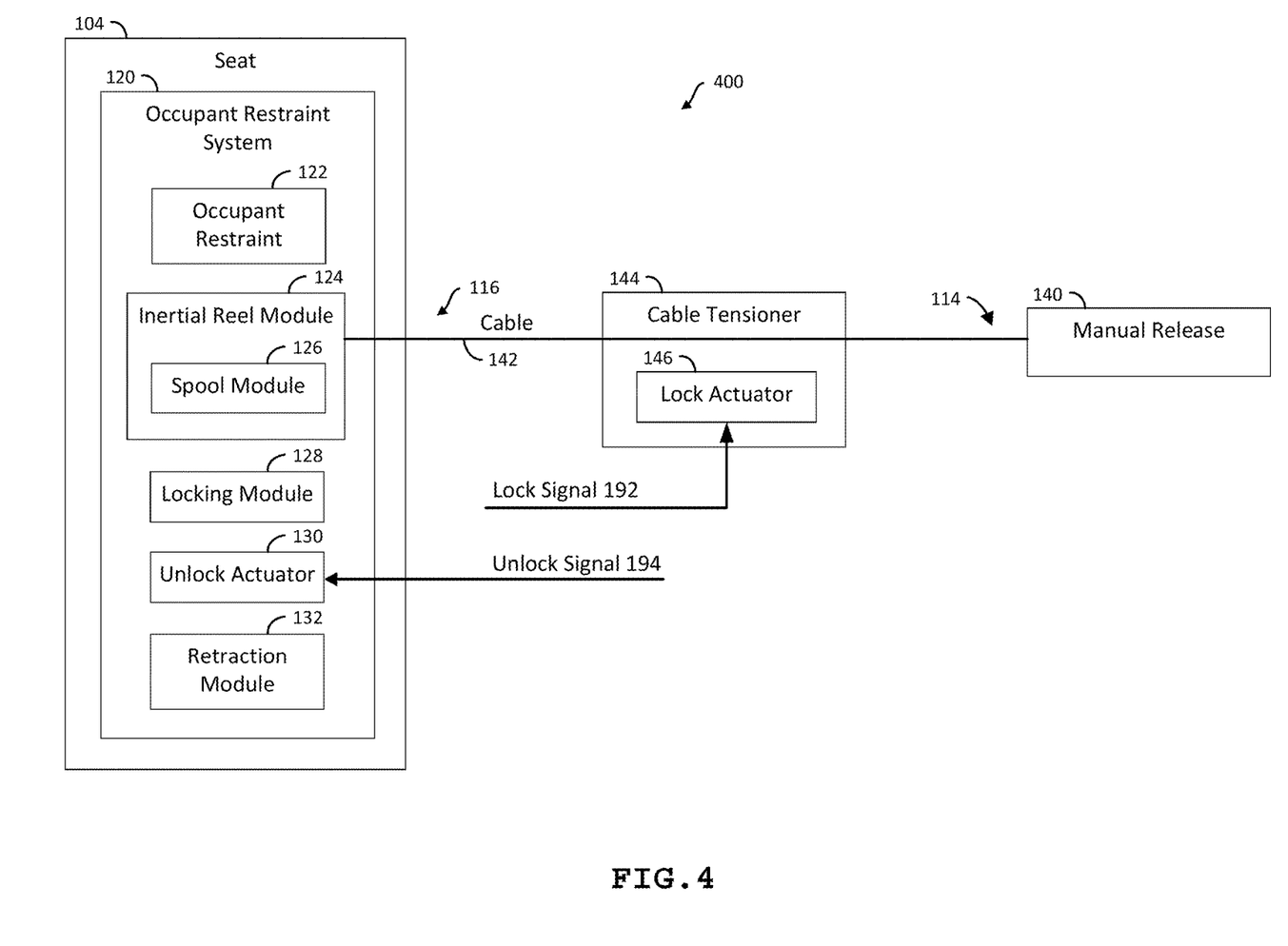
FIG. 4 illustrates a manual release and cable tensioning system for use with a biometrically actuated occupant restraint system, in accordance with various embodiments.

Referring now to FIG. 4, a manual release and cable tensioning system 400 for use with a biometrically actuated occupant restraint system 120 is illustrated, in accordance with various embodiments. Manual release and cable tensioning system 400 may form a part of a vehicle 100, such as illustrated in FIG. 2, or form part of an aircraft 100, such as illustrated in FIGS. 1A-1B. Manual release and cable tensioning system 400 may include a manual release 140 that is operably connected to a first end 114 of cable 142 where an intermediate portion of cable 142 passes through a portion of cable tensioner 144 that is operably connected to lock actuator 146 to apply tension to cable 142, as described above. Lock actuator 146 may include a solenoid and a mechanical linkage for electromechanically operating inertial reel module 124 to place inertial reel module 124 from an unlocked to a locked position in response to lock actuator 146 being activated. In various embodiments, lock actuator 146 may include a motor and gear assembly for moving inertial reel module 124 from an unlocked to a locked position lock actuator 146 is activated. A second end 116 of cable 142 is operably connected to occupant restraint system 120 to manually control operation of inertial reel module 124 to lock inertial reel module 124 in response to lock actuator 146 being activated or to release inertial reel module 124 in response to manual release 140 being activated. In this manner, lock actuator 146 may lock spool module 126 in response to occupant incapacitated signal 190 by applying tension to cable 142 through cable tensioner 144. Manual release and cable tensioning system 400 could be made as a retrofit kit or modification procedure for existing seats in a production aftermarket, for example. A corresponding method of modification may be understood from this disclosure.

Figure 5:
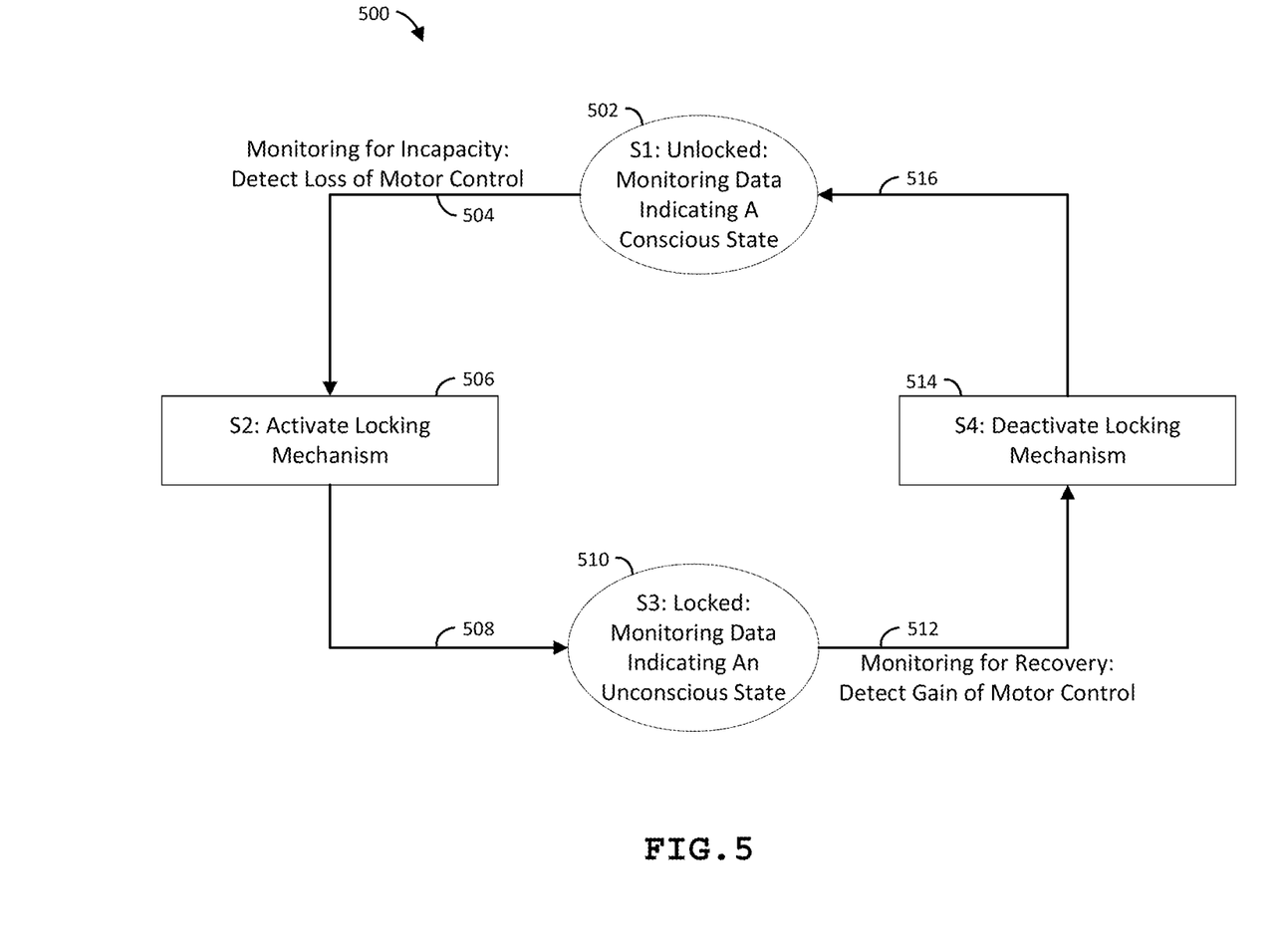
FIG. 5 illustrates a state-diagram flowchart for a method of controlling a biometrically actuated occupant restraint system, in accordance with various embodiments.

Referring now to FIG. 5, a state-diagram flowchart for a method 500 of controlling a biometrically actuated occupant restraint system is illustrated, in accordance with various embodiments. Method 500 illustrates an algorithm of operating occupant restraint system 120 in accordance with various embodiments. Method 500 may be implemented by instructions 184 stored in memory 182 and operating on processor 180, as described above. In particular, method 500 may begin with state 1 (S1) in step 502 where occupant restraint system 120 is unlocked and controller 154 is monitoring sensor data indicating a conscious status of occupant 106 and to detect (e.g. determine) that occupant 106 has lost consciousness and/or lost motor control and may therefore be incapable of controlling the vehicle and/or incapable of controlling their own body (e.g. incapacity) to prevent injury based on analyzing data from one or more of the plurality of biometric sensors in biometric sensor module 152, as described above. Stated differently, controller 154 monitors sensor data from biometric sensor module 152 to determine a change from a baseline value related to baseline data indicative of an unconscious state of occupant 106. In response to processing data from the one or more of the plurality of sensors in biometric sensor module 152, controller 154 may detect that occupant has lost consciousness or lost motor control and has become incapacitated, method 500 advances (arrow 504) toward state S2 in step 506 where controller 154 outputs a command to apply tension through cable tensioner 144 by activating lock actuator 146, as described above. Method 500 may then advance (arrow 508) toward state S3 in step 510 where occupant restraint system 120 is locked and controller 154 is monitoring data indicating an unconscious state of occupant 106 to detect whether occupant has regained motor control. Stated differently, controller 154 monitors sensor data from biometric sensor module 152 to determine a change from a new baseline value related to data indicative of a conscious state of occupant 106. Method 500 will remain in state S3 (step 510) and retain occupant restraint system 120 in a locked condition until occupant 106 has regained consciousness or motor control, or, in the case occupant 106 is a pilot of an aircraft similar to aircraft 100, an ejection sequence has been initiated.

While in state S3 (step 510), controller 154 continues to monitor the unconscious state of occupant 106 and to detect whether occupant 106 has gained (e.g., regained) consciousness and/or motor control and may be capable of controlling the vehicle and/or capable of controlling their own body (e.g. capacity) to prevent injury based on analyzing data from one or more of the plurality of biometric sensors in biometric sensor module 152. In response to processing data from the one or more of the plurality of sensors, controller 154 may detect that occupant 106 has gained motor control and has become capable of controlling the vehicle and/or controlling their own body, method 500 advances (arrow 512) toward state S4 in step 514 where controller 154 outputs a command to release tension through cable tensioner 144 by activating unlock actuator 130, as described above. Method 500 may then advance (arrow 516) toward state S1 in step 502 where occupant restraint system 120 is unlocked and controller 154 is monitoring the status of occupant 106 to again detect whether occupant has lost motor control. Method 500 may remain in state S1 (step 502) and retain occupant restraint system 120 in an unlocked condition until occupant 106 has lost consciousness or lost motor control.

Figure 6:
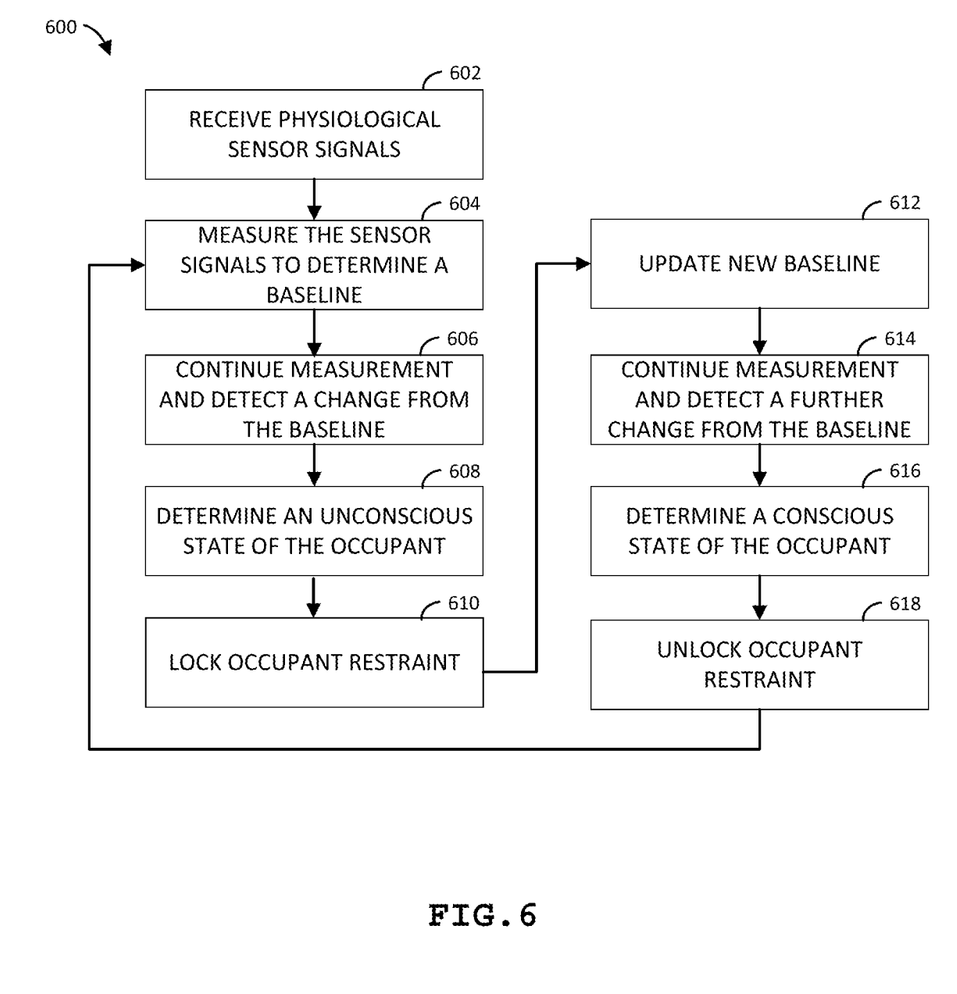
FIG. 6 illustrates a flowchart for a method of controlling a biometrically actuated occupant restraint system, in accordance with various embodiments.

Referring now to FIG. 6, a flowchart for a method 600 of controlling a biometrically actuated occupant restraint system is illustrated, in accordance with various embodiments. With reference to FIGS. 1A-5, method 600 begins in step 602 with controller 154 receiving a plurality of physiological sensor signals from biometric sensor module 152 based on the physiological condition of a vehicle occupant 106. Method 600 continues in step 604 with controller 154 measuring each of the plurality of physiological sensor signals to determine a baseline value from each sensor that is stored in memory 182 in a plurality of baseline data memory locations 186. Method 600 continues in step 606 with controller 154 determining a change from the baseline for one or more sensor (e.g., current) values related to an unconscious state of the occupant. In this manner, controller has determined occupant 106 is in an unconscious state or they have lost motor control in step 608. After determining occupant 106 is unconscious, method 600 continues with step 610 by outputting a command to lock occupant restraint system 120 by asserting lock signal 192, as discussed above. Method 600 continues with step 612 by updating a new baseline data value in memory 182 in one or more baseline data memory locations 186 for the one or more of the plurality of sensors with changes to their baseline values. Method 600 continues in step 614 with continuing to measure each of the plurality of physiological sensor signals to determine a new baseline value from each of the plurality of sensors. Method 600 continues in step 616 with determining a change from the new baseline for one or more sensor current values related to a conscious state of the occupant. In this manner, controller has determined occupant 106 is in a conscious state or they have gained motor control. Method 600 continues in step 618 by unlocking occupant restraint device 122 by asserting unlock signal 194, as discussed above. Finally, method 600 proceeds back to step 604, to measure the plurality of sensor signals and determine (again) a baseline in response to occupant 106 being in a conscious state, and the process of method 600 continues.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed:

1. A biomedically actuated occupant restraint system, comprising:
    an occupant restraint system for a vehicle, the occupant restraint system having a locked position and an unlocked position; and
    an occupant monitoring system operably connected to the occupant restraint system, the occupant monitoring system configured for monitoring a plurality of physiological conditions of an occupant of the vehicle, the occupant monitoring system including:
        a biometric sensor module including a plurality of physiological sensors configured for measuring the plurality of physiological conditions of the occupant and asserting a plurality of physiological sensor signals; and
        a controller configured to receive the plurality of physiological sensor signals and determine whether the occupant is incapacitated, wherein the determination of whether the occupant is incapacitated is based on at least one of data from the plurality of physiological sensor signals indicating a loss of motor control by the occupant or indicating of a loss of consciousness by the occupant, the controller being configured to send a command to lock the occupant restraint system in response to determining the occupant is incapacitated.

2. The biomedically actuated occupant restraint system of claim 1, the controller being configured to send a command to unlock the occupant restraint system in response to determining the occupant is not incapacitated.

3. The biomedically actuated occupant restraint system of claim 1, wherein the occupant restraint system includes an occupant restraint device configured to selectively extend and retract, the occupant restraint device configured to not extend when the occupant restraint system is locked, the occupant restraint device configured to retract in response to movement of the occupant toward a neutral position.

4. The biomedically actuated occupant restraint system of claim 3, wherein the occupant restraint device is a torso restraint.

5. The biomedically actuated occupant restraint system of claim 4, wherein the torso restraint includes at least one of a belt, a strap, and a harness configured for restraining a torso of the occupant.

6. The biomedically actuated occupant restraint system of claim 1, wherein the vehicle is an aerospace vehicle.

7. The biomedically actuated occupant restraint system of claim 6, further comprising:
    a seat disposed in the vehicle adjacent to an occupant restraint device, the occupant restraint device configured for restraining the occupant in relation to a seat back portion of the seat.

8. The biomedically actuated occupant restraint system of claim 7, wherein the seat is an ejection seat having an ejection propulsion system, and
    wherein the occupant restraint device is integrated with the ejection seat.

9. The biomedically actuated occupant restraint system of claim 8, the occupant restraint system further comprising:
    an inertial reel module with a spool module having a cylindrical element for attaching to an end portion of the occupant restraint device to at least one of extend and retract at least a portion of the occupant restraint device to selectively tighten and loosen, the spool module configured to rotate to tighten in response to movement of the occupant toward a neutral position.

10. The biomedically actuated occupant restraint system of claim 9, further comprising:
    a manual release operably connected to the occupant restraint system for manually locking and unlocking the occupant restraint system; and
    a lock actuator operably connected to the controller, the lock actuator for locking the inertial reel module based on a command from the controller.

11. The biomedically actuated occupant restraint system of claim 9, further comprising:
    a retraction module that is operably coupled to the occupant restraint system and configured to rapidly retract the occupant restraint device in the ejection seat prior to ejection.

12. The biomedically actuated occupant restraint system of claim 1, wherein the biometric sensor module includes one or more of an electroencephalogram (EEG) sensor, an electrocardiogram (ECG) sensor, a blood pressure (BP) sensor, an oxygen and/or respiration sensor, a camera, and/or a microphone.

13. The biomedically actuated occupant restraint system of claim 1, wherein the controller includes a tangible, non-transitory memory configured to communicate with the controller, the tangible, non-transitory memory having instructions stored thereon that, in response to execution by the controller, cause the controller to perform operations comprising:
    receiving, by the controller, the plurality of physiological sensor signals based on a physiological condition of the occupant;
    measuring, by the controller, each of the plurality of physiological sensor signals to determine a baseline value from each sensor;

determining, by the controller, a change from the baseline value related to data indicative of the occupant being incapacitated; and outputting, by the controller, the command to lock the occupant restraint system.

14. The biomedically actuated occupant restraint system of claim 13, further comprising:

measuring, by the controller, each of the plurality of physiological sensor signals to determine a new baseline value from each sensor;

determining, by the controller, a change from the new baseline value related to data indicative of the occupant having motor control or being conscious; and outputting, by the controller, the command to unlock the occupant restraint system.

15. A method for biomedically actuating an occupant restraint system, comprising:

receiving a plurality of physiological sensor signals based on a physiological condition of an occupant of a vehicle;

measuring each of the plurality of physiological sensor signals to determine a baseline value from each sensor;

determining a change from the baseline value related to data indicative of the occupant being incapacitated, wherein the determination of whether the occupant is incapacitated is based on at least one of data from the plurality of physiological sensor signals indicating a loss of motor control by the occupant or indicating of a loss of consciousness by the occupant; and outputting a command to lock the occupant restraint system for the occupant in the vehicle.

16. The method of claim 15, further comprising:

measuring each of the plurality of physiological sensor signals to determine a new baseline value from each sensor;

determining a change from the new baseline value related to data indicative of the occupant having motor control or being conscious; and outputting a command to unlock the occupant restraint system.

17. A computer-readable medium storing instructions that when executed by a controller cause the controller to perform a method biomedically actuating an occupant restraint system, the method comprising:

receiving a plurality of physiological sensor signals based on a physiological condition of an occupant of a vehicle;

measuring each of the plurality of physiological sensor signals to determine a baseline value from each sensor;

determining a change from the baseline value related to data indicative of the occupant being incapacitated, wherein the determination of whether the occupant is incapacitated is based on at least one of data from the plurality of physiological sensor signals indicating a loss of motor control by the occupant or indicating of a loss of consciousness by the occupant; and outputting a command to lock the occupant restraint system for the occupant in the vehicle.

18. The computer-readable medium of claim 17, further comprising:

measuring each of the plurality of physiological sensor signals to determine a new baseline value from each sensor;

determining a change from the new baseline value related to data indicative of the occupant having motor control or being conscious; and outputting a command to unlock the occupant restraint system.

19. The computer-readable medium of claim 17, wherein the occupant restraint system includes an occupant restraint device configured to selectively extend and retract, the occupant restraint device configured to not extend when the occupant restraint system is locked, the occupant restraint device configured to retract in response to movement of the occupant toward a neutral position.

* * * * *